US009979792B2

United States Patent
Goto

(10) Patent No.: US 9,979,792 B2
(45) Date of Patent: May 22, 2018

(54) COMMUNICATION APPARATUS THAT, IN A DIRECT PRINTING MODE, IS CONTROLLED NOT TO TRANSFER A SEARCH SIGNAL TO ANOTHER PRINTER REGARDLESS OF THE STATE OF THE OTHER PRINTER, CONTROL METHOD THEREFOR, AND STORAGE MEDIUM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 14/297,303

(22) Filed: Jun. 5, 2014

(65) Prior Publication Data
US 2014/0369331 A1    Dec. 18, 2014

(30) Foreign Application Priority Data
Jun. 12, 2013  (JP) ................................. 2013-124173

(51) Int. Cl.
  *H04L 29/08*  (2006.01)
  *H04W 4/20*  (2018.01)
  *H04W 4/00*  (2018.01)

(52) U.S. Cl.
  CPC ............. *H04L 67/16* (2013.01); *H04W 4/20* (2013.01); *H04W 4/008* (2013.01)

(58) Field of Classification Search
  CPC .......... H04L 67/16; H04W 4/20; G06F 3/128; G06F 3/1226; G06F 3/1291
  See application file for complete search history.

(56) References Cited

U.S. PATENT DOCUMENTS

| 6,298,405 B1* | 10/2001 | Ito .......................... G06F 3/1208 |
| | | 710/107 |
| 7,139,908 B2 | 11/2006 | Hamamoto et al. .............. 713/2 |
| 8,777,343 B2 | 7/2014 | Ishikawa et al. ................. 347/9 |
| 2006/0200563 A1* | 9/2006 | Hirose .................... H04L 29/06 |
| | | 709/227 |
| 2007/0177822 A1* | 8/2007 | Uno ................... H04N 1/00204 |
| | | 382/305 |

(Continued)

FOREIGN PATENT DOCUMENTS

JP      2011-035768 A    2/2011

*Primary Examiner* — Hoon J Chung
*Assistant Examiner* — Zhensheng Zhang
(74) *Attorney, Agent, or Firm* — Fitzpatrick, Cella, Harper & Scinto

(57) ABSTRACT

A communication apparatus operating as an access point on a network receives a signal transmitted by a communication apparatus on the network, transfers the signal to another communication apparatus on the network, and transmits, in response to a request signal, a response signal containing function information of the communication apparatus operating as the access point to a transmission source communication apparatus of the request signal on the network, which has transmitted the request signal. The communication apparatus controls transfer so that the transmission source communication apparatus of the request signal receives no response signal from a communication apparatus other than the communication apparatus operating as the access point on the network.

10 Claims, 10 Drawing Sheets

(56) References Cited

U.S. PATENT DOCUMENTS

| | | | |
|---|---|---|---|
| 2008/0205385 A1* | 8/2008 | Zeng | H04L 45/00 370/389 |
| 2011/0113252 A1* | 5/2011 | Krischer | H04L 63/0823 713/175 |
| 2011/0116398 A1* | 5/2011 | Nakahara | H04W 52/0216 370/252 |
| 2012/0182967 A1* | 7/2012 | Sato | H04W 4/06 370/331 |
| 2013/0297938 A1 | 11/2013 | Goto | 713/171 |
| 2014/0085666 A1* | 3/2014 | Park | H04W 4/008 358/1.15 |
| 2014/0293325 A1* | 10/2014 | Haapanen | G06F 3/1268 358/1.15 |

* cited by examiner

COMMUNICATION APPARATUS THAT, IN A DIRECT PRINTING MODE, IS CONTROLLED NOT TO TRANSFER A SEARCH SIGNAL TO ANOTHER PRINTER REGARDLESS OF THE STATE OF THE OTHER PRINTER, CONTROL METHOD THEREFOR, AND STORAGE MEDIUM

BACKGROUND OF THE INVENTION

Field of the Invention

The present invention relates to a communication apparatus, a control method therefor, and a storage medium.

Description of the Related Art

In recent years, cases each using an electronic device such as a digital camera incorporating a wireless LAN client function by connecting it to another device are increasing. For example, Japanese Patent Laid-Open No. 2011-35768 discloses a method of facilitating sharing images with another digital camera by incorporating a wireless LAN function in a digital camera. Furthermore, to directly connect devices with each other, electronic devices often incorporate a wireless LAN access point function. When an electronic device incorporates a wireless LAN access point function, it also incorporates a DHCP server function in many cases in order to facilitate assigning IP addresses.

Among devices connected with each other via a wireless LAN, a device which requires a desired service searches for another device having a desired service function upon completion of addressing by the DHCP server function. Note that a digital camera or printer corresponds to a service providing device having a shooting service function or print service function. Such service search is performed using a service search protocol such as mDNS (Multicast DNS) or SSDP (Simple Service Discovery Protocol). The layers of communication protocols such as service search protocols are different from each other in a so-called OSI reference model. Therefore, the wireless LAN client function and wireless LAN access point function generally operate the same protocol.

As described above, a service providing device such as a printer or digital camera conventionally has a wireless LAN client function, and a device having a wireless LAN access point function need only use a service search protocol. That is, the device having the wireless LAN access point function need only simply transfer a service search signal. Since, however, the service providing device such as a printer or digital camera incorporates the wireless LAN access point function, the transfer function of the service search protocol operates, as shown in FIG. 4.

FIG. 4 is a sequence chart showing an operation sequence when digital camera A operating as a client performs a service search. Referring to FIG. 4, digital camera A, digital camera B, printer A, and printer B incorporate a wireless LAN client function and a wireless LAN access point function, and exist on the same network. In this example, digital camera A, digital camera B, and printer B operate as clients, and printer A operates as an access point. When digital camera A multicasts a service search request signal, printer A transfers the received service search request signal to other apparatuses on the same network. In the example of FIG. 4, printer A operating as an access point transfers the received service search request signal to printer B and digital camera B both of which are controlled apparatuses connected to printer A and operate as clients. As a result, digital camera A receives a search response from each of printer A, printer B, and digital camera B. Even though the user of digital camera A intends to connect to printer A whose wireless LAN access point function is operating, it also becomes possible to connect to unnecessary digital camera B and printer B, thereby confusing the user.

SUMMARY OF THE INVENTION

The present invention has been made in consideration of the above problem, and provides a technique of readily notifying a user of a desired service providing device even if service providing devices have a wireless LAN access point function.

According to one aspect of the present invention, there is provided a communication apparatus operating as an access point on a network, comprising: a transfer unit configured to receive a signal transmitted by a communication apparatus on the network, and transfer the signal to another communication apparatus on the network; a transmission unit configured to transmit, in response to a request signal, a response signal containing function information of the communication apparatus operating as the access point to a transmission source communication apparatus of the request signal on the network, which has transmitted the request signal; and a control unit configured to control the transfer unit so that the transmission source communication apparatus receives no response signal from a communication apparatus other than the communication apparatus operating as the access point on the network.

Further features of the present invention will become apparent from the following description of exemplary embodiments (with reference to the attached drawings).

DESCRIPTION OF THE EMBODIMENTS

First Embodiment

A communication apparatus according to this embodiment will be described in detail below with reference to the accompanying drawings. Although a case in which a wireless LAN system complying with the IEEE802.11 standard series is used will be explained below, a communication mode is not necessarily limited to a wireless LAN complying with the IEEE802.11 standard, and any communication mode may be used.

Figure 1:
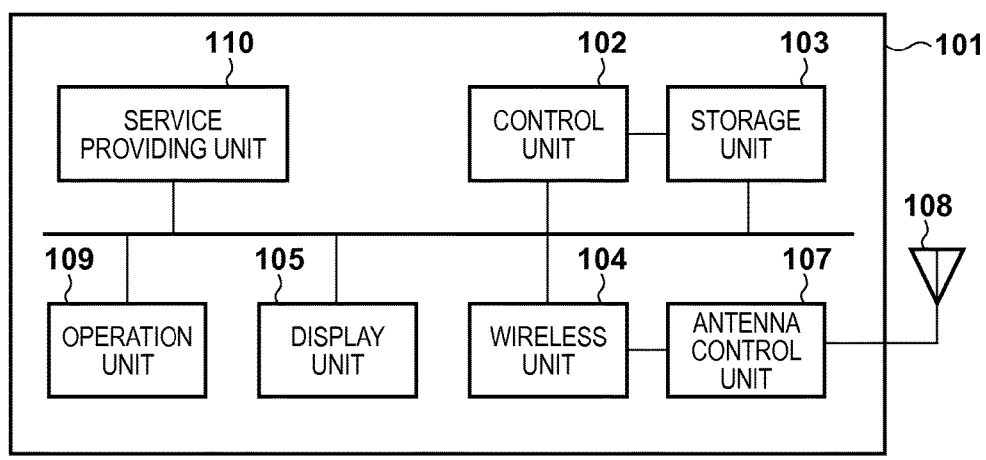
FIG. 1 is a block diagram showing the arrangement of a communication apparatus according to an embodiment.

FIG. 1 is a block diagram showing an example of the arrangement of a communication apparatus 101 according to this embodiment. A control unit 102 controls the overall apparatus by executing control programs stored in a storage unit 103. The control unit 102 also controls setting of communication parameters with another apparatus. The storage unit 103 stores control programs executed by the control unit 102, and various kinds of information such as communication parameters. Various operations (to be described later) are performed when the control unit 102 executes the control programs stored in the storage unit 103. A wireless unit 104 performs wireless LAN communication complying with the IEEE802.11 standard series.

A display unit 105 has a function of outputting visually perceivable information like an LCD or LED, and a function of outputting sound like a loudspeaker, and performs various display operations. The display unit 105 is also used as a user interface (to be referred to as a UI hereinafter). An antenna control unit 107 and an antenna 108 are used for wireless communication. An operation unit 109 is used by the user to perform various input operations. Note that when the user operates the operation unit 109, various input operations may be performed based on information displayed on the display unit 105 serving as a user interface. A service providing unit 110 controls services other than a communication function. For example, when the communication apparatus 101 is a digital camera, the service providing unit 110 provides an image capturing function. Alternatively, when the communication apparatus 101 is a printer, the service providing unit 110 provides a printing function. Note that FIG. 1 shows an example, and the communication apparatus 101 may have a hardware arrangement other than that shown in FIG. 1.

Figure 2:
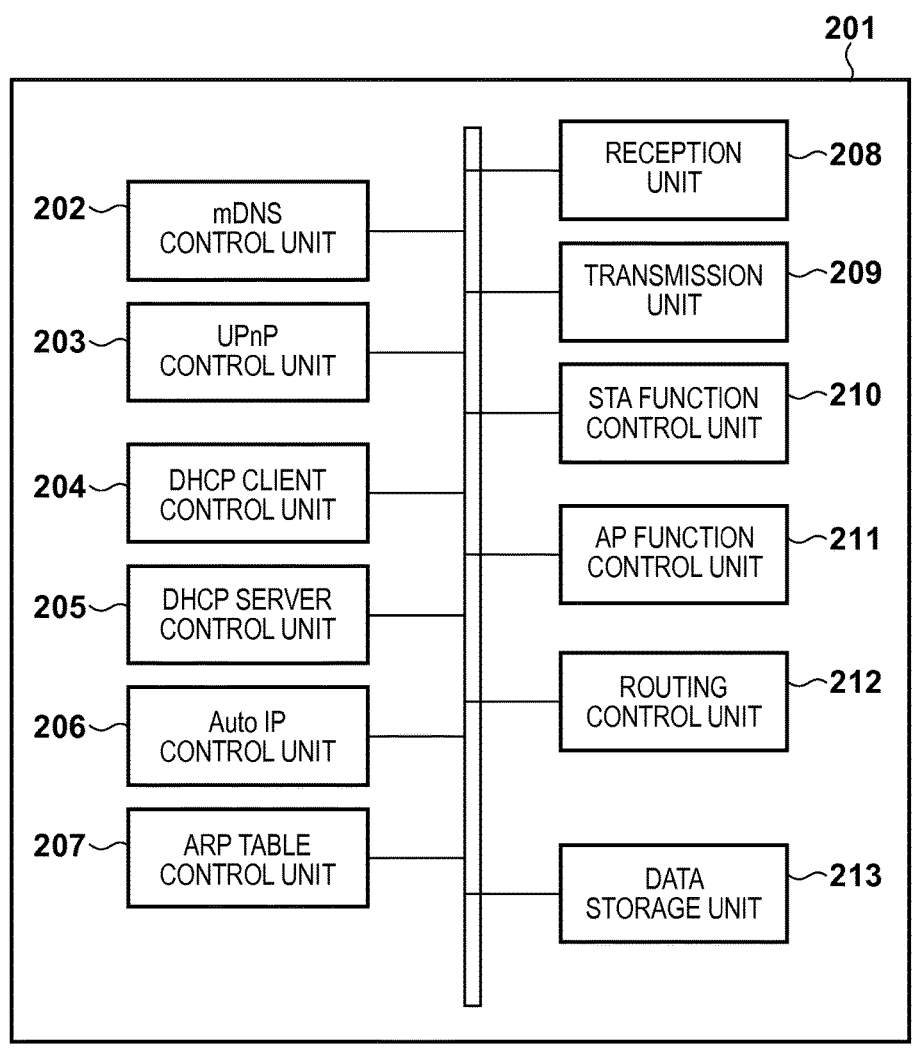
FIG. 2 is a block diagram showing the software functions of the communication apparatus according to the embodiment.

FIG. 2 is a block diagram showing an example of an arrangement 201 of software functions for executing the communication control function of the communication apparatus 101 according to this embodiment. An mDNS (multicast DNS) control unit 202 and UPnP (Universal Plug and Play) control unit 203 respectively control service search protocols. A DHCP client control unit 204 and DHCP server control unit 205 execute a DHCP client function and DHCP server function, respectively, in accordance with the role of the communication apparatus 101. The DHCP server control unit 205 has a DHCP address table serving as a management table of IP addresses assigned to opposite communication apparatuses. An Auto IP control unit 206 controls to set an IP address when the DHCP client control unit 204 cannot acquire an address. An ARP table control unit 207 manages an ARP table for linking an IP address with a MAC address upon completion of communication in the IP layer.

A reception unit 208 and transmission unit 209 receive and transmit signals (packets) complying with any protocols including an upper protocol. An STA (station) function control unit 210 executes authentication/encryption processing and the like when the communication apparatus operates as a station (client). An AP (access point) function control unit 211 executes management of a communication partner apparatus and authentication/encryption processing when the communication apparatus 101 operates as an access point. One or both of the STA function control unit 210 and AP function control unit 211 can operate.

While the AP function control unit 211 is operating, a routing control unit 212 bridges and routes a received signal. A data storage unit 213 stores and holds software itself and various tables such as the above-described DHCP address table and ARP table. Note that all the function blocks shown in FIG. 2 are not limited to those provided as software components and some of them may be provided as hardware components. The respective function blocks shown in FIG. 2 have mutual relations. The respective function blocks shown in FIG. 2 are merely an example. A plurality of function blocks may form one function block, or any one of the function blocks may be divided into a plurality of function blocks.

Figure 3:
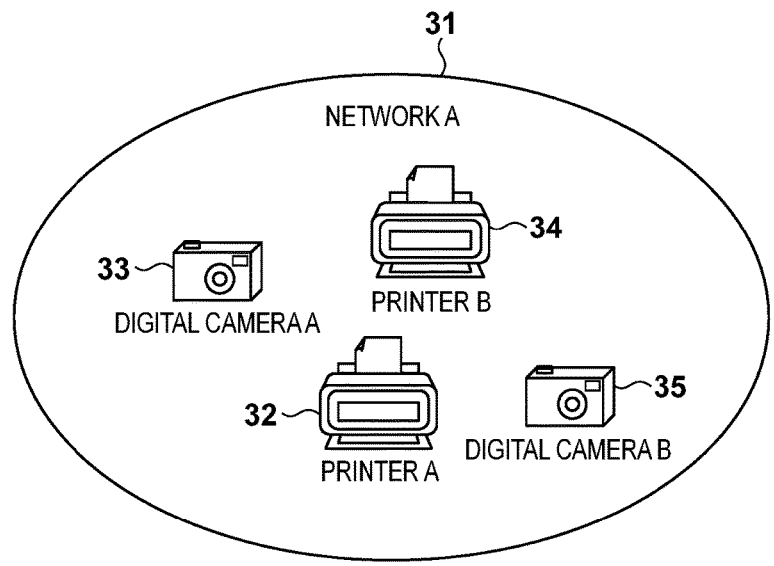
FIG. 3 is a view showing an example of a network arrangement according to the embodiment.

FIG. 3 is a view showing the arrangement of a network A 31 (to be referred to as network A hereinafter) using a wireless LAN according to this embodiment. Referring to FIG. 3, network A can be formed from a printer A 32 (to be referred to as printer A hereinafter), a digital camera A 33 (to be referred to as digital camera A hereinafter), a printer B 34 (to be referred to as printer B hereinafter), and a digital camera B 35 (to be referred to as digital camera B hereinafter). Each of these devices has the arrangement shown in FIGS. 1 and 2. Note that a printer and digital camera will be exemplified in this embodiment for descriptive convenience. However, any types of devices such as a PC, scanner, and smartphone may be used as long as they have a wireless LAN communication function.

Figure 5:
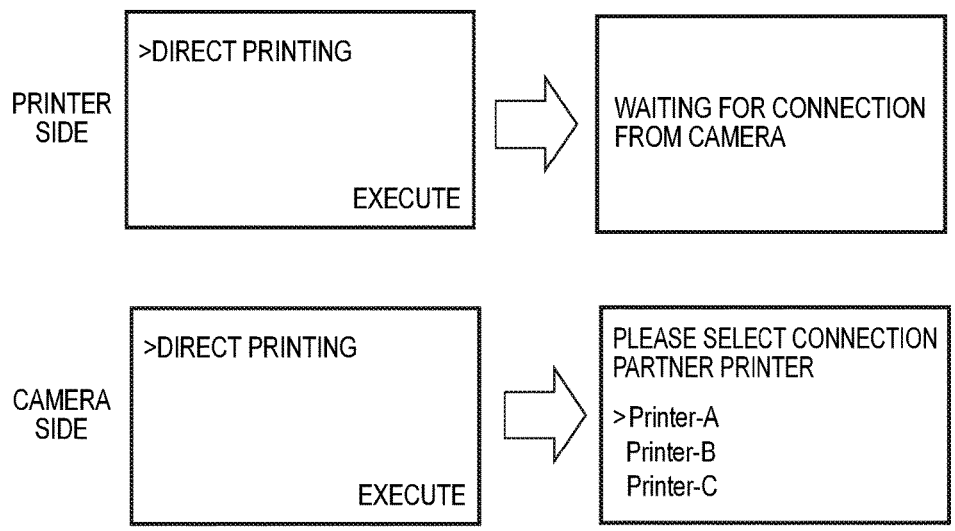
FIG. 5 is a view showing an example of the user interfaces of conventional communication apparatuses.

In this embodiment, consider a case in which a digital camera and printer are directly connected with each other to print an image in the digital camera by the printer. FIG. 5 is a view showing an example of the user interfaces (UIs) of conventional communication apparatuses. FIG. 5 shows the UI of a printer and that of a digital camera. The user selects and executes "direct printing" on the UI of the printer. After that, "waiting for connection from camera" is displayed on the UI of the printer, and the printer waits for connection from a digital camera. Similarly, on the digital camera side, the user selects and executes "direct printing" on the UI. The digital camera searches for a printer which provides a print service, thereby displaying possible printers as options of connection partners on the UI. The user selects a desired printer from the options displayed on the UI to print an image.

In the example shown in FIG. 5, the user selects a desired printer from the options. By definition, "direct printing" indicates that a camera and printer are connected in one-to-one correspondence to execute printing without requiring any selection processing by the user. In the example shown in FIG. 5, however, the user selects a desired printer from the options. This degrades the user convenience when implementing "direct printing".

To solve this problem, in this embodiment, consider a method in which the user can select (designate) a desired printer without presenting options to the user in the digital camera. Note that the term "(camera) direct printing" is a conceptual term for describing the embodiment, and does not limit an actual print processing protocol. In Japan, for example, there is a printing protocol such as PictBridge of CIPA (Camera & Imaging Products Association), and a direct printing protocol using MTP or PTP is common by world standards. In this embodiment, a protocol is not limited to the specific ones.

Figure 6:
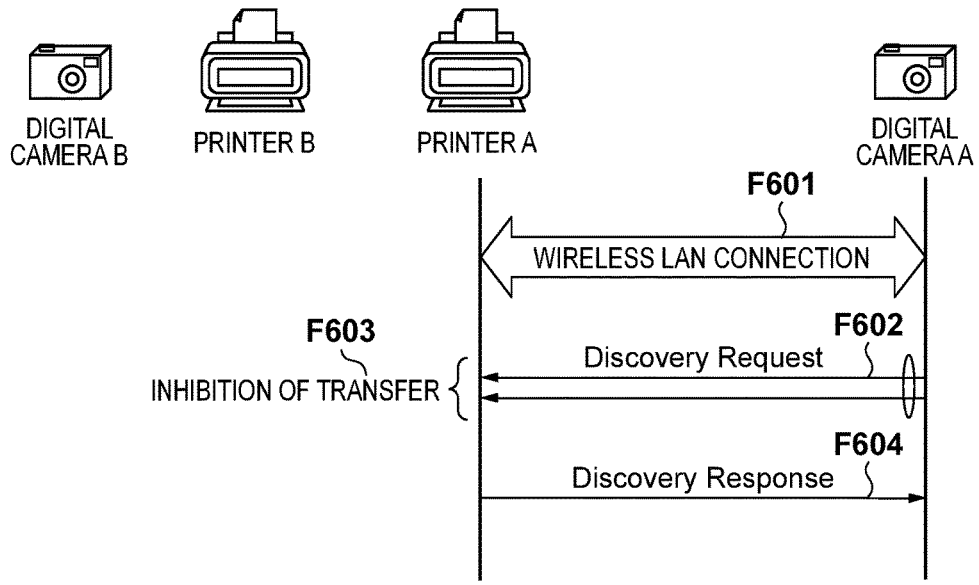
FIG. 6 is a sequence chart within a network according to the first embodiment.

The operation of the communication apparatus 101 according to this embodiment will be described with reference to FIG. 6. FIG. 6 is a sequence chart showing an operation sequence between digital camera A, digital camera B, printer A, and printer B on the network shown in FIG. 3.

Printer A performs an operation characteristic to this embodiment. Each of digital camera A, digital camera B, and printer B is operating its wireless LAN client function. Printer A is operating its wireless LAN access point function. Note that printer A, printer B, and digital camera B are already connected to each other via the wireless LAN.

Digital camera A and printer A perform and complete wireless LAN connection (F601). After that, digital camera A broadcasts or multicasts a service search request signal Discovery Request for searching for a device which provides a print service, that is, a device capable of performing printing (F602). Note that the service search request signal need only be a signal for searching for a service, and any protocol is usable. For example, UPnP, mDNS, or GAS defined by the IEEE802.11u standard may be used.

Figure 4:
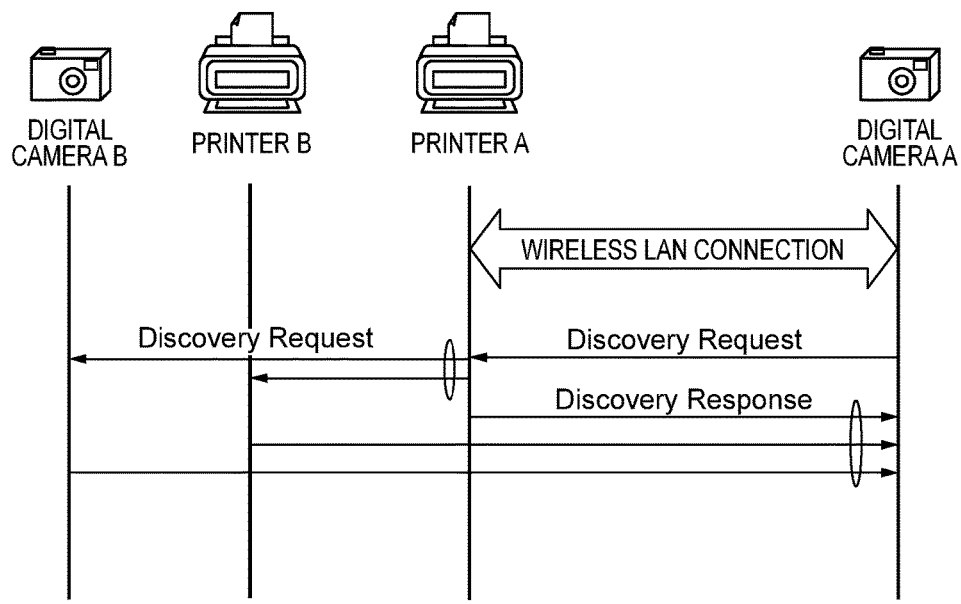
FIG. 4 is a sequence chart showing the operation of a conventional communication apparatus.

In the conventional example, as shown in FIG. 4, upon receiving the broadcast or multicast service search request signal, printer A transfers the received signal to digital camera B and printer B as controlled communication apparatuses. In this embodiment, however, printer A performs no transfer processing by controlling to inhibit the service search request signal from being transferred to another apparatus (F603). Consequently, camera A receives a service search response signal Discovery Response from only printer A (F604). As a result, digital camera A can execute print processing with only printer A.

Figure 7:
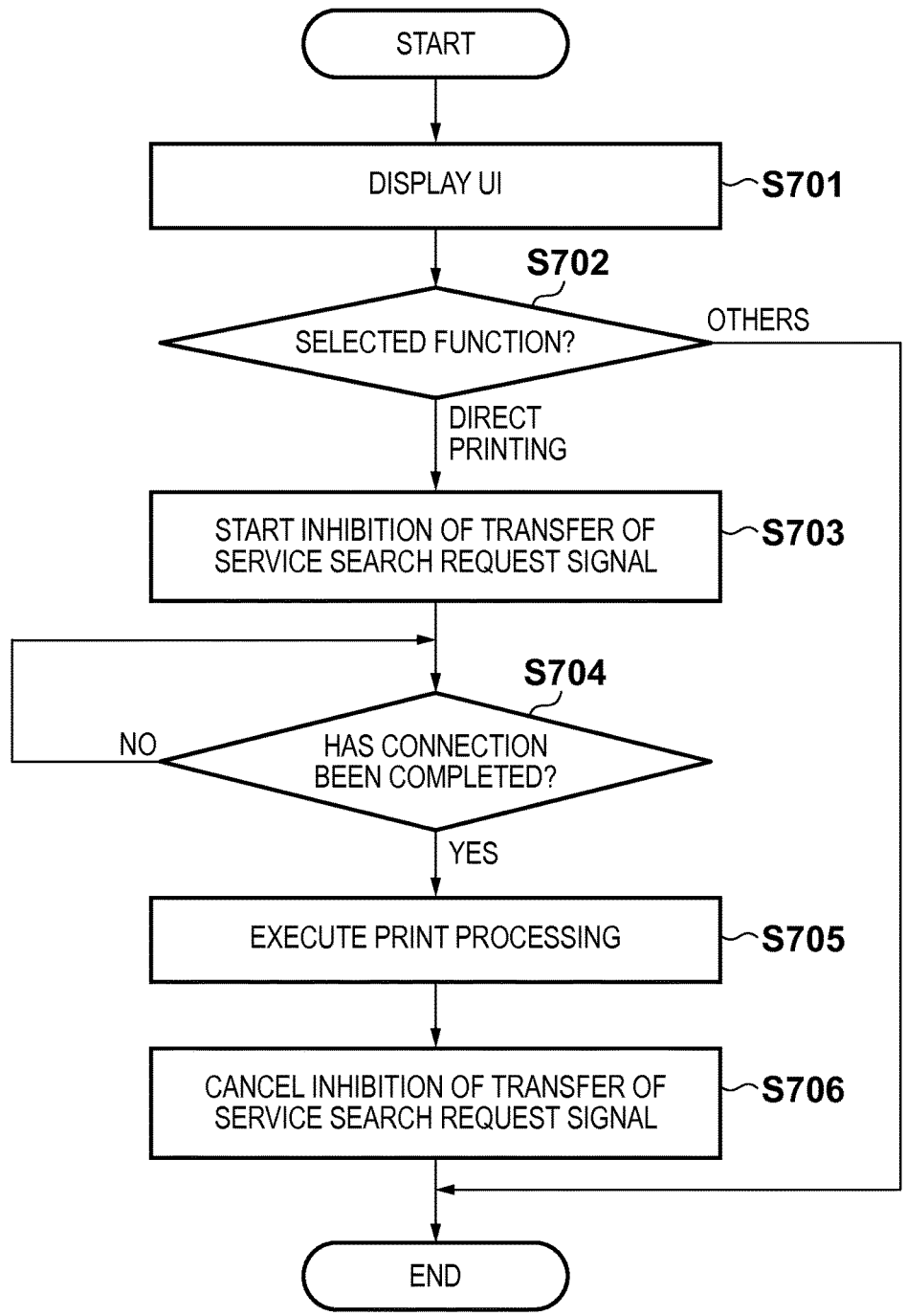
FIG. 7 is a flowchart illustrating the operation of printer A according to the first embodiment.

FIG. 7 is a flowchart illustrating the operation of printer A as the communication apparatus 101 according to this embodiment. Upon completion of wireless LAN connection, information of printing functions including "direct printing" is displayed on the display unit 105 serving as the UI of printer A (step S701). The user selects one of the printing functions as operation modes displayed on the display unit 105 by operating the operation unit 109. The control unit 102 determines the printing function selected on the display unit 105 (step S702). If the user selects and executes "direct printing" shown in FIG. 5 ("direct printing" in step S702), the AP function control unit 211 controls the routing control unit 212 to start inhibition of transfer of the received service search request signal (step S703). That is, printer A does not transfer the service search request signal to either digital camera B or printer B as a controlled communication apparatus. Note that all UPnP or mDNS signals (packets) may be inhibited from being transferred, or only a signal for searching for a specific service such as a print service may be inhibited from being transferred as in this embodiment.

Printer A waits for completion of connection performed when the user selects printer A in digital camera A (step S704). Upon completion of connection with digital camera A (YES in step S704), printer A executes print processing (step S705). Upon completion of the print processing, the AP function control unit 211 controls the routing control unit 212 to permit transfer of a signal of the type which has been inhibited from being transferred in step S703 (step S706). Note that the AP function control unit 211 may discard signals obtained from when inhibition of transfer starts until inhibition of transfer is canceled. On the other hand, if it is determined in step S702 that a printing function other than "direct printing" has been selected ("others" in step S702), the process ends without performing any special processing. This is preferable especially when printer A is mainly used as a wireless LAN access point instead of a printer.

As described above, in this embodiment, a communication apparatus which is operating the access point function inhibits a service search request signal from being transferred to another controlled communication apparatus. With this processing, a communication apparatus operating as a client which desires a specific service can search for only a communication apparatus having the service function without searching for communication apparatuses other than that communication apparatus, thereby improving the user convenience.

Second Embodiment

In the first embodiment, a case in which when the communication apparatus 101 which operates the access point function inhibits a service search request signal from being transferred, a communication apparatus operating as a client which desires a service can quickly specify a desired partner has been explained. In this embodiment, a case in which a communication apparatus 101 which operates an access point function prohibits a service search response signal from being transferred will be described. The difference from the first embodiment will be explained below.

Figure 8:
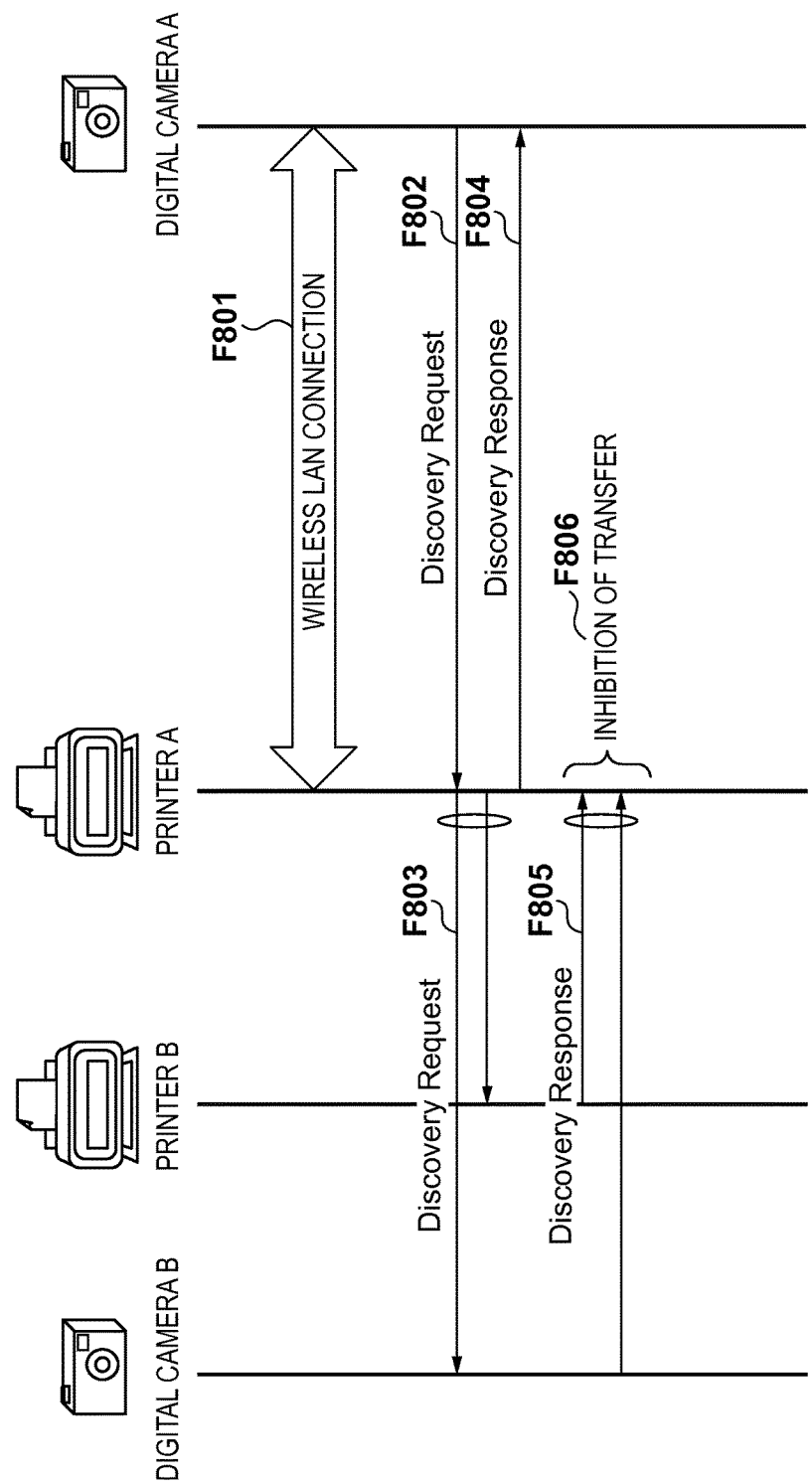
FIG. 8 is a sequence chart within a network according to the second embodiment.

FIG. 8 is a sequence chart showing an operation sequence between digital camera A, digital camera B, printer A, and printer B on the network shown in FIG. 3. Printer A performs an operation characteristic to this embodiment. Each of digital camera A, digital camera B, and printer B is operating its wireless LAN client function, and printer A is operating its wireless LAN access point function. Note that printer A, printer B, and digital camera B are already connected to each other via a wireless LAN.

Digital camera A and printer A perform and complete wireless LAN connection (F801). After that, the digital camera broadcasts or multicasts a service search request signal Discovery Request for searching for a device capable of performing printing (F802). Note that the service search request signal need only be a signal for searching for a service, and any protocol is usable. For example, UPnP, mDNS, or GAS defined by the IEEE802.11u standard may be used.

Similarly to the conventional example shown in FIG. 4, upon receiving the broadcast or multicast service search request signal, printer A transfers the received signal to digital camera B and printer B as controlled communication apparatuses (F803). Printer A returns a service response signal Discovery Response containing service information of the self apparatus to digital camera A (F804). Each of digital camera B and printer B returns, to printer A, a service search response signal as a response to the service search request signal transferred by printer A (F805). In the conventional example, as shown in FIG. 4, upon receiving the service search response signals from printer B and digital camera B, printer A transfers the received signals to digital camera A as a request source communication apparatus. In this embodiment, however, printer A can prevent the received service search response signals from being transferred to digital camera A (F806).

Figure 9:
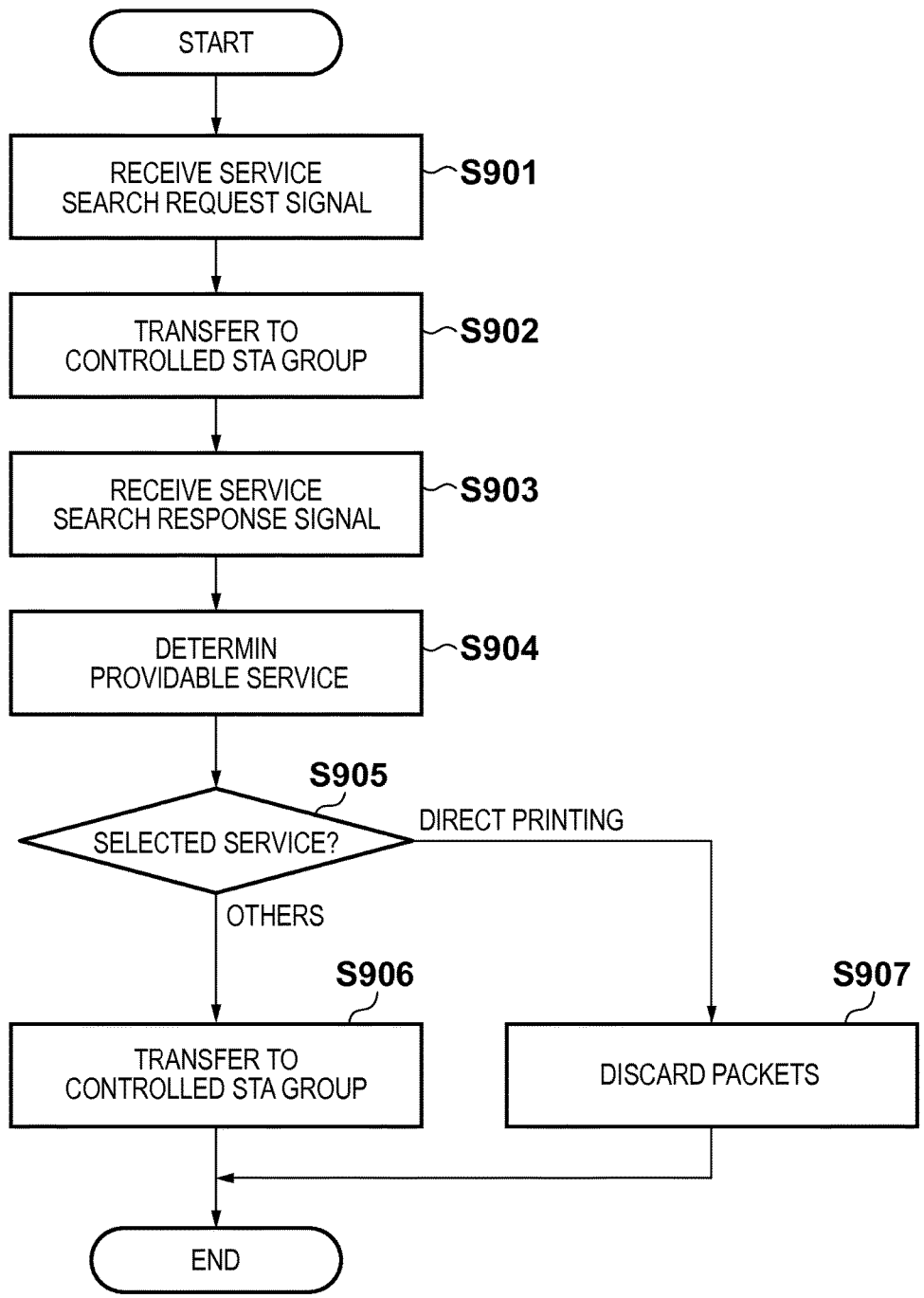
FIG. 9 is a first flowchart showing the operation of printer A according to the second embodiment.

FIG. 9 is a flowchart illustrating the operation of printer A as the communication apparatus 101 according to this embodiment. Similarly to FIG. 7 described in the first embodiment, after completion of wireless LAN connection, when the user selects "direct printing" from printing functions displayed on a display unit 105, and executes it, printer A receives a service search request signal from digital camera A (step S901). Printer A transfers the received service search request signal to printer B and digital camera B as a controlled apparatus group (step S902). Printer A receives a service search response signal as a response to the service search request signal from each of printer B and digital camera B (step S903). At this time, printer A confirms service information (function information) contained in each service search response signal, and determines a providable service (step S904).

If it is determined that the providable service is direct printing ("direct printing" in step S905), an AP function control unit 211 discards the service search response signals (step S907). This is done to prevent printer A from notifying digital camera A of a plurality of devices capable of performing direct printing. On the other hand, if it is determined that the providable service is a service other than direct printing ("others" in step S905), the AP function control unit 211 controls a routing control unit 212 to transfer the received signals to printer B and digital camera B as a controlled apparatus group (step S906). Note that a case in which printer A discards the service search response signals in step S907 has been described. However, instead of discarding the signals, the signals may be changed by rewriting service information, device information, and the like contained in each signal by information of the self apparatus, and transferred to printer B and digital camera B as a controlled apparatus group. After step S906 or S907, printer A performs processing in step S704 and subsequent steps of FIG. 7.

Figure 12:
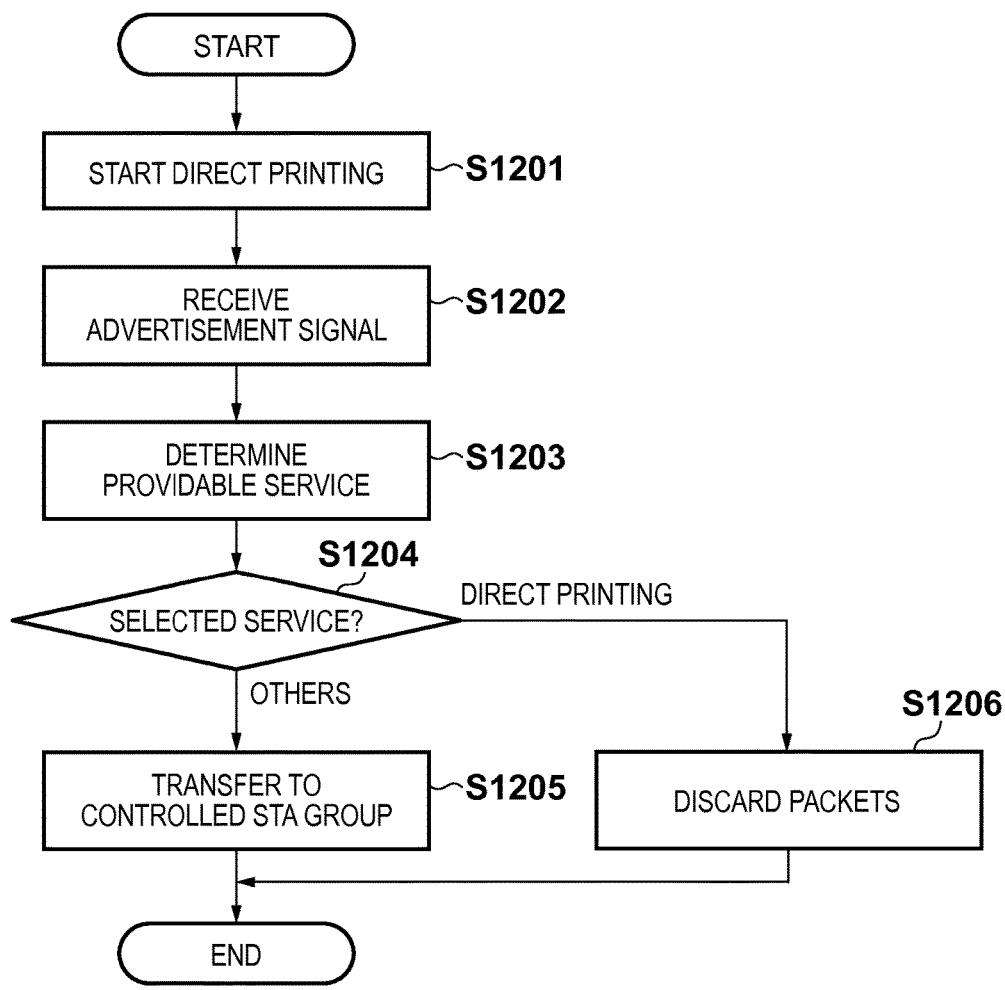
FIG. 12 is a second flowchart showing the operation of printer A according to the second embodiment.

Although handling of the service search response signals has been explained in this embodiment, printer A may select whether to transfer or limit the service search response signals, based on pieces of self service information autonomously advertise by printer B and digital camera B. FIG. 12 is a flowchart illustrating the operation of printer A in this case. Upon completion of wireless LAN connection, printer A starts direct printing by a user operation (step S1201). After that, printer A receives the advertisement signal containing the self service information from each of printer B and digital camera B (step S1202). Printer A confirms the service information contained in each received advertisement signal, and determines a providable service. Note that simultaneously with reception of the signals Advertise, printer A receives a service search response signal from each of printer B and digital camera B.

If it is determined that the providable service is a service other than direct printing ("others" in step S1204), the AP function control unit 211 transfers the received service search response signals to printer B and digital camera B as a controlled apparatus group (step S1205). On the other hand, if it is determined that the providable service is direct printing ("direct printing" in step S1204), the AP function control unit 211 discards the received service search response signals (step S1206). Note that a case in which printer A discards the service search response signals in step S1206 has been described. However, instead of discarding the signals, the signals may be changed by rewriting service information, device information, and the like contained in each signal by information of the self apparatus, and transferred to printer B and digital camera B as a controlled apparatus group. After step S1205 or S1206, printer A performs processing in step S704 and subsequent steps of FIG. 7.

As described above, in this embodiment, a communication apparatus which is operating an access point function inhibits a service search response signal from being transferred to another controlled communication apparatus as a request source. With this processing, a communication apparatus operating as a client which desires a specific service can search for only a communication apparatus having the service function without searching for communication apparatuses other than that communication apparatus, thereby improving the user convenience.

Third Embodiment

In the first and second embodiments, a case in which easy print service search processing is implemented under the control of the printer has been explained. In this embodiment, a case in which service search response signals are filtered under the control of a digital camera will be described. The difference from the first and second embodiments will be explained below.

Figure 10:
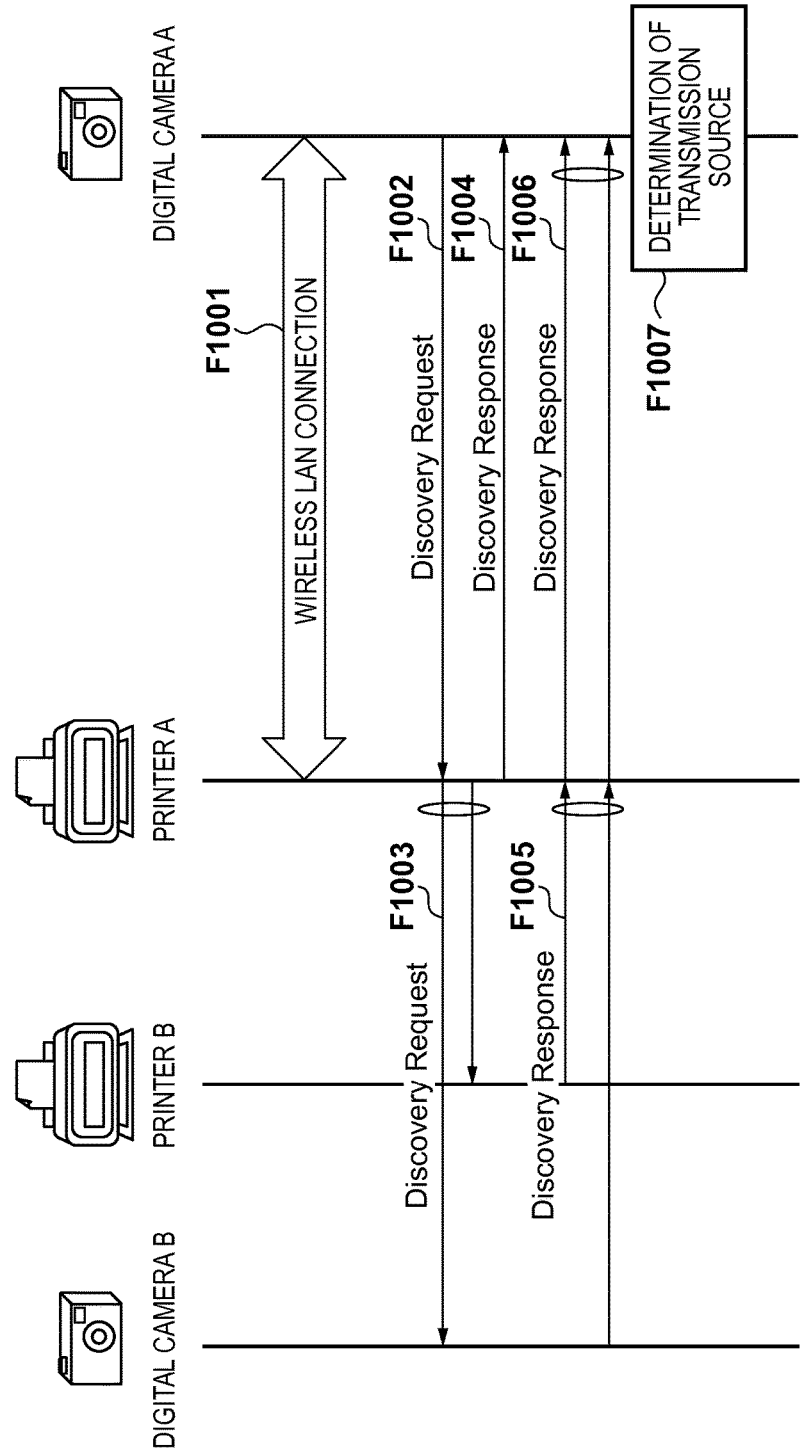
FIG. 10 is a sequence chart within a network according to the third embodiment.

FIG. 10 is a sequence chart showing an operation sequence between digital camera A, digital camera B, printer A, and printer B on the network shown in FIG. 3. Digital camera A performs an operation characteristic to this embodiment. Each of digital camera A, digital camera B, and printer B is operating its wireless LAN client function, and printer A is operating its wireless LAN access point function.

Digital camera A and printer A perform and complete wireless LAN connection (F1001). A storage unit 103 of digital camera A stores identification information (for example, a MAC address) of printer A as a connection destination. After that, the digital camera broadcasts a service search request signal Discovery Request for searching a device capable of performing printing (F1002). Note that the service search request signal need only be a signal for searching for a service, and any protocol is usable. For example, UPnP, mDNS, or GAS defined by the IEEE802.11u standard may be used.

Similarly to the conventional example shown in FIG. 4, upon receiving the broadcast service search request signal, printer A transfers the received signal to digital camera B and printer B as controlled communication apparatuses (F1003). Printer A returns a service response signal Discovery Response containing service information of the self apparatus to digital camera A (F1004). Each of digital camera B and printer B returns, to printer A, a service search response signal as a response to the service search request signal transferred by printer A (F1005). Similarly to the conventional example shown in FIG. 4, upon receiving the service search response signals from printer B and digital camera B, printer A transfers the received signals to digital camera A as a request source communication apparatus (F1006). Upon receiving the service search response signals from printer A, printer B, and digital camera B, digital camera A discards, based on the identification information stored in the storage unit 103, the received service search response signal whose transmission source is not consistent with the identification information (F1007).

Figure 11:
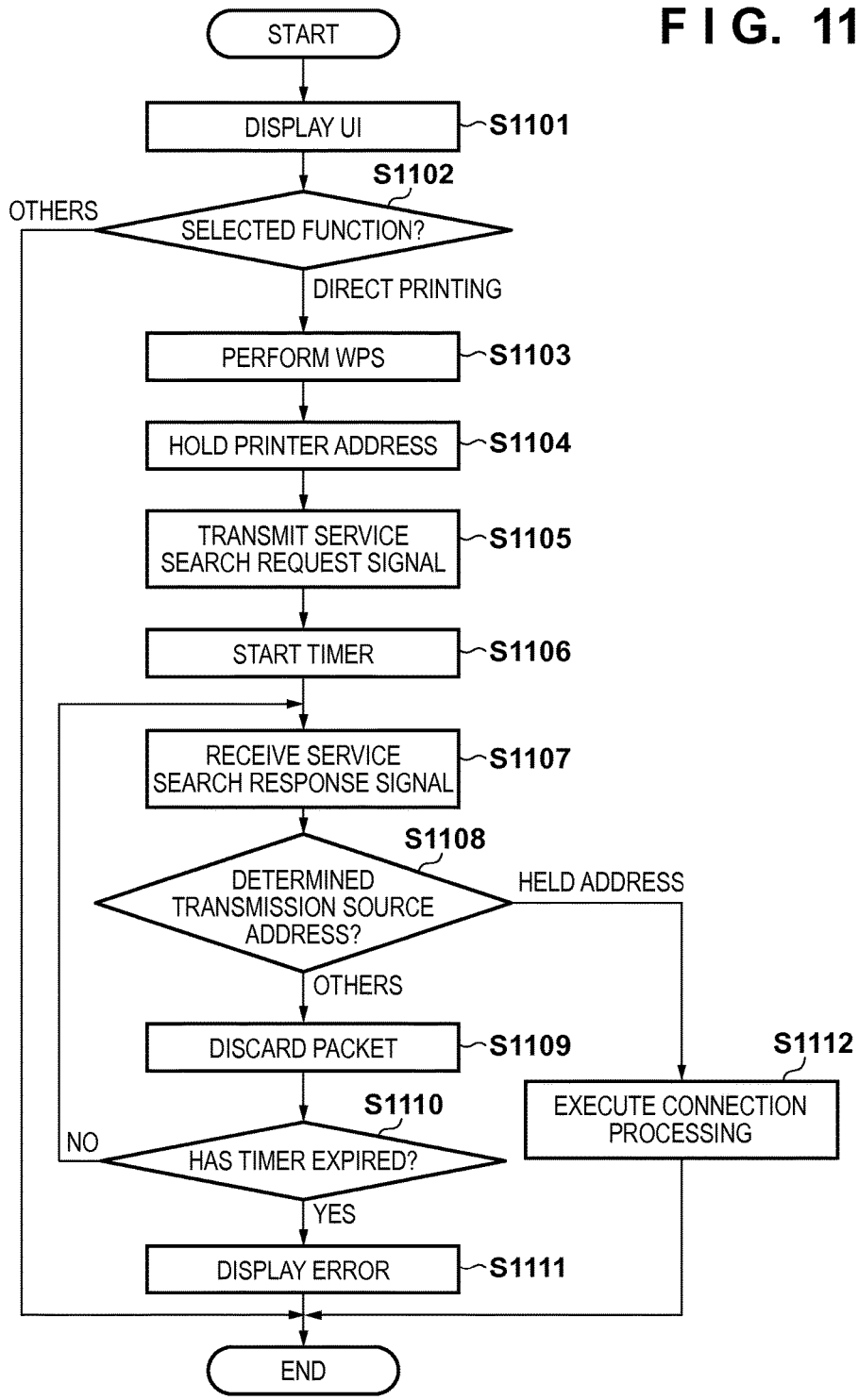
FIG. 11 is a flowchart illustrating the operation of printer A according to the third embodiment.

FIG. 11 is a flowchart illustrating the operation of digital camera A as a communication apparatus 101 according to this embodiment. Upon completion of wireless LAN connection, information of printing functions including "direct printing" is displayed on a display unit 105 of digital camera A (step S1101). The user selects one of the printing functions displayed on the display unit 105 by operating an operation unit 109. A control unit 102 determines the printing function selected on the display unit 105 (step S1102). If the user selects and executes "direct printing" shown in FIG. 5 (step S1102), an STA function control unit 210 of digital camera A exchanges parameters with printer A (step S1103). In this embodiment, the parameters are exchanged when the STA function control unit 210 of digital camera A performs WPS (Wi-Fi Protected Setup) with printer A. Performing WPS enables digital camera A to readily obtain the MAC address of printer A as a partner apparatus, and also enables the user to perform wireless connection and setting of a print partner apparatus by one operation. Note that any methods other than WPS may be used as long as digital camera A can explicitly designate printer A as a printing destination, and recognize identification information (the MAC address, SSID, encryption key, and the like) of printer A.

The storage unit 103 of digital camera A acquires and holds identification information (for example, the MAC address) of printer A (step S1104). Digital camera A multicasts a service search request signal Discovery Request for searching for a device capable of performing printing (step S1105). At this time, the STA function control unit 210 starts a timer (not shown) for searching for a communication partner device for a given period (step S1106). After that, digital camera A receives a service search response signal Discovery Response as a response to the service search request signal transmitted in step S1105 (step S1107). Based on the identification information held in the storage unit 103, the STA function control unit 210 of digital camera A determines a transmission source address contained in the received service search response signal (step S1108).

If it is determined that the transmission source address in the service search response signal is different from the held identification information, the STA function control unit 210 discards the received service search response signal (step S1109). After discarding the signal, in order to wait for reception of a subsequent service search response signal, digital camera A determines whether the timer has expired, (step S1110). If the timer has not expired, the process returns to step S1107 and digital camera A waits for a service search response signal. Alternatively, if it is determined in step S1110 that the timer has expired, the STA function control unit 210 determines that no connection partner exists, and displays an error on the display unit 105 (step S1111). On the other hand, if it is determined in step S1108 that the transmission source address is the same as the held address, the STA function control unit 210 starts connection processing and print processing, thereby terminating the process (step S1112).

Note that handling of a service search response signal as a response to a service search request signal has been described in this embodiment. However, it may be decided whether to refer to or discard a response signal by determining the transmission source address of self service information autonomously advertise by each of printer B and digital camera B.

As described above, in this embodiment, a communication apparatus holds, in advance, identification information of another desired communication apparatus. When the transmission source address of a service search response signal received from another communication apparatus is the same as the held identification information, the communication apparatus starts connection processing. With this processing, the communication apparatus can search for only the other communication apparatus which provides a desired service without searching for communication apparatus other than that communication apparatus, thereby improving the user convenience.

Other Embodiments

Each of the aforementioned embodiments merely indicates one example to implement the present invention, and various changes can be made without departing from the scope of the present invention. The first to third embodiments can be combined. Furthermore, the user may arbitrarily select whether each communication apparatus operates according to the first embodiment, the second embodiment, or the third embodiment. Note that the communication apparatus according to each of the aforementioned embodiments is not limited to a digital camera or printer. The communication apparatus may be a PC, a tablet terminal, or a mobile terminal such as a mobile phone or smartphone. Alternatively, the communication apparatus may be an image processing apparatus such as a copying machine, scanner, FAX, or multifunction peripheral, or a digital home electric appliance such as a TV set or recorder. Furthermore, a wireless LAN complying with the IEEE802.11 standard has been explained above in the first embodiment. The present invention, however, may be implemented in another wireless communication such as wireless USB, MBOA, Bluetooth®, UWB, or ZigBee®. Also, the present invention may be implemented in a wired communication medium such as a wired LAN. Note that MBOA is an abbreviation for Multi Band OFDM Alliance. UWB includes wireless USB, wireless 1394, and WINET.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-124173, filed Jun. 12, 2013 which is hereby incorporated by reference herein in its entirety.

What is claimed is:

1. A printer, comprising:
   at least one memory storing instructions; and
   at least one processor that, upon execution of instructions stored in the at least one memory, performs the functions of
      a creating unit configured to create a wireless network in a case where the printer operates as an access point;
      a first connection unit configured to connect to another printer via the wireless network created by said creating unit;
      a second connection unit configured to connect to a communication apparatus via the wireless network created by said creating unit;
      a receiving unit configured to receive a search signal to search a printer from the communication apparatus;
      a responding unit configured to respond to the search signal received by the receiving unit;

a transferring unit configured to transfer the search signal received by the receiving unit to the other printer;

an operation unit configured to cause a user to input an instruction for an operation mode;

a determination unit configured to determine whether a direct printing mode is inputted by the user via the operation unit, wherein the direct printing mode is an operation mode which directly communicates with the communication apparatus not via an external access point to execute print processing;

a control unit configured to control the responding unit to respond to the search signal received and the transferring unit to transfer the search signal to the other printer regardless of a state of the other printer, in a case where the determination unit determines that the direct printing mode is not inputted by the user, and to control the responding unit to respond to the search signal and the transferring unit not to transfer the search signal to the other printer regardless of a state of the other printer, in a case where the determination unit determines that the direct printing mode is inputted by the user; and a printing unit configured to execute print processing in response to a request from the communication apparatus.

2. The printer according to claim 1, wherein the wireless network created by said creating unit is a wireless LAN complying with the IEEE802.11 standard.

3. The printer according to claim 1, wherein the printer changes the operation mode from the direct printing mode in response to finishing the print processing executed by the printing unit while the printer operates in the direct printing mode.

4. A printer, comprising:
at least one memory storing instructions; and
at least one processor that, upon execution of instructions stored in the at least one memory, performs the functions of
a creating unit configured to create a wireless network in a case where the printer operates as an access point;
a first connection unit configured to connect to another printer via the wireless network created by said creating unit;
a second connection unit configured to connect to a communication apparatus via the wireless network created by said creating unit;
a receiving unit configured to receive a search signal to search a printer from the communication apparatus;
a responding unit configured to respond to the search signal received by the receiving unit;
a transferring unit configured to transfer a response to the search signal from the other printer;
an operation unit configured to cause a user to input an instruction for an operation mode;
a determination unit configured to determine whether a direct printing mode is inputted by the user via the operation unit, wherein the direct printing mode is an operation mode which directly communicates with the communication apparatus not via an external access point to execute print processing;
a control unit configured to control the responding unit to respond to the search signal and the transferring unit to transfer the response to the communication apparatus regardless of a state of the other printer, in a case where the determination unit determines that the direct printing mode is not inputted by the user, and to control the responding unit to respond to the search signal and the transferring unit not to transfer the response to the communication apparatus regardless of a state of the other printer, in a case where the determination unit determines that the direct printing mode is inputted by the user; and
a printing unit configured to execute print processing in response to a request from the communication apparatus.

5. The apparatus according to claim 4, wherein the wireless network created by said creating unit is a wireless LAN complying with the IEEE802.11 standard.

6. The printer according to claim 4, wherein the printer changes the operation mode from the direct printing mode in response to finishing the print processing executed by the printing unit while the printer operates in the direct printing mode.

7. A control method for a printer, comprising steps of:
creating a wireless network in a case where the printer operates as an access point;
connecting to another printer via the created wireless network;
connecting to a communication apparatus via the created wireless network;
receiving a search signal to search a printer from the communication apparatus;
determining whether a direct printing mode is instructed by a user, wherein the direct printing mode is an operation mode which directly communicates with the communication apparatus not via an external access point to execute print processing;
responding to the search signal received and transferring the search signal to the other printer regardless of a state of the other printer, in a case where it is determined that the direct printing mode is not instructed by the user, and responding to the search signal and not transferring the search signal to the other printer regardless of a state of the other printer, in a case where it is determined that the direct printing mode is instructed by the user; and
executing print processing in response to a request from the communication apparatus,
wherein at least one of the steps is performed by a processor cooperating with a memory.

8. A control method for a printer, comprising steps of:
creating a wireless network in a case where the printer operates as an access point;
connecting to another printer via the created wireless network;
connecting to a communication apparatus via the created wireless network;
receiving a search signal to search a printer from the communication apparatus;
determining whether a direct printing mode is instructed by a user, wherein the direct printing mode is an operation mode which directly communicates with the communication apparatus not via an external access point to execute print processing;
responding to the search signal and transferring a response to the search signal from the other printer to the communication apparatus regardless of a state of the other printer, in a case where it is determined that the direct printing mode is not instructed by the user, and responding to the search signal and not transferring the response to the communication apparatus regardless of a state of the other printer, in a case where it is determined that the direct printing mode is instructed by the user; and executing print processing in response to a request from the communication apparatus, wherein at least one of the steps is performed by a processor cooperating with a memory.

9. A non-transitory computer-readable storage medium storing a program which, when executed by a computer, executes steps of a control method for a printer, the method comprising:

creating a wireless network in a case where the printer operates as an access point;

connecting to another printer via the created wireless network;

connecting to a communication apparatus via the created wireless network;

receiving a search signal to search a printer from the communication apparatus;

determining whether a direct printing mode is instructed by a user, wherein the direct printing mode is an operation mode which directly communicates with the communication apparatus not via an external access point to execute print processing;

responding to the search signal received and transferring the search signal to the other printer regardless of a state of the other printer, in a case where it is determined that the direct printing mode is not instructed by the user, and responding to the search signal and not transferring the search signal to the other printer regardless of a state of the other printer, in a case where it is determined that the direct printing mode is instructed by the user; and executing print processing in response to a request from the communication apparatus.

10. A non-transitory computer-readable storage medium storing a program which, when executed by a computer, executes steps of a control method for a printer, the method comprising:

creating a wireless network in a case where the printer operates as an access point;

connecting to another printer via the created wireless network;

connecting to a communication apparatus via the created wireless network;

receiving a search signal to search a printer from the communication apparatus;

determining whether a direct printing mode is instructed by a user, wherein the direct printing mode is an operation mode which directly communicates with the communication apparatus not via an external access point to execute print processing;

responding to the search signal and transferring a response to the search signal from the other printer to the communication apparatus regardless of a state of the other printer, in a case where it is determined that the direct printing mode is not instructed by the user, and responding to the search signal and not transferring the response to the communication apparatus regardless of a state of the other printer, in a case where it is determined that the direct printing mode is instructed by the user; and executing print processing in response to a request from the communication apparatus.

* * * * *